US006775900B2

(12) United States Patent
Dawson et al.

(10) Patent No.: US 6,775,900 B2
(45) Date of Patent: Aug. 17, 2004

(54) METHOD OF FORMING A STATOR

(75) Inventors: Richard Nils Dawson, Voorheesville, NY (US); John A. Petti, Schenectady, NY (US); Steven C. Walko, Clifton Park, NY (US); Robert J. Nygard, Saratoga Springs, NY (US)

(73) Assignee: General Electric Company, Schenectady, NY (US)

( * ) Notice: Subject to any disclaimer, the term of this patent is extended or adjusted under 35 U.S.C. 154(b) by 53 days.

(21) Appl. No.: 10/073,209

(22) Filed: Feb. 13, 2002

(65) Prior Publication Data

US 2002/0070631 A1 Jun. 13, 2002

Related U.S. Application Data

(62) Division of application No. 09/733,556, filed on Dec. 8, 2000, now Pat. No. 6,597,081.

(51) Int. Cl.[7] .................... H02K 15/00; H02K 15/14; H02K 15/16
(52) U.S. Cl. .................... 29/596; 29/597; 29/598; 310/254; 310/258; 310/259
(58) Field of Search .................... 29/596, 597, 598; 310/254, 258, 259

(56) References Cited

U.S. PATENT DOCUMENTS

| 1,685,054 A | * | 9/1928 | Hibbard .................... 310/258 |
| 2,300,964 A | | 11/1942 | Putman |
| 3,153,215 A | | 10/1964 | Burkhardt et al. |
| 3,652,889 A | | 3/1972 | Reece et al. |
| 3,708,707 A | | 1/1973 | Kranz |
| 3,787,744 A | | 1/1974 | Saito |
| 3,988,622 A | | 10/1976 | Starcevic |
| 4,031,422 A | | 6/1977 | Armor et al. |
| 4,032,874 A | | 6/1977 | Kudlacik et al. |
| 4,145,626 A | | 3/1979 | Aroshidze et al. |
| 4,200,854 A | | 4/1980 | DeLaurentis et al. |
| 4,564,779 A | | 1/1986 | Terry, Jr. |
| 4,712,035 A | * | 12/1987 | Forbes et al. ................ 310/269 |
| 4,837,471 A | | 6/1989 | Kostoss |
| 4,859,891 A | | 8/1989 | Jenkins et al. |
| 4,904,890 A | | 2/1990 | Archibald et al. |
| 4,916,803 A | | 4/1990 | Estrada |
| 5,027,500 A | | 7/1991 | Keck et al. |
| 5,075,959 A | | 12/1991 | Keck et al. |
| 5,118,979 A | | 6/1992 | Shih et al. |
| 5,316,801 A | | 5/1994 | Hopeck |
| 5,329,197 A | | 7/1994 | Kudlacik |
| 5,358,432 A | | 10/1994 | Shih et al. |
| 5,398,397 A | * | 3/1995 | Johnson ........................ 29/596 |
| 5,430,340 A | | 7/1995 | Shih et al. |
| 5,473,207 A | | 12/1995 | Hopeck et al. |
| 5,886,434 A | | 3/1999 | Nygard |
| 5,913,243 A | | 6/1999 | Hopeck et al. |
| 5,986,380 A | | 11/1999 | Kaminski et al. |
| 6,020,670 A | | 2/2000 | Jones et al. |
| 6,127,761 A | | 10/2000 | Shen et al. |
| 6,194,807 B1 | | 2/2001 | Kaminski et al. |
| 6,448,686 B1 | | 9/2002 | Dawson et al. |
| 6,597,081 B2 | | 7/2003 | Dawson et al. |

* cited by examiner

*Primary Examiner*—Carl J. Arbes
*Assistant Examiner*—Tim Phan
(74) *Attorney, Agent, or Firm*—Nixon & Vanderhye P.C.

(57) ABSTRACT

A stator and a method of forming the stator comprises providing a stator frame having a frame plate, and connecting key bars to the frame plate at respective connection points, each of the key bars having a dovetail. The stator and method further includes providing a stator core comprising laminations each having a dovetail slot formed therein. Each dovetail is engaged into a respective dovetail slot so that at least some of the dovetails contact respective laminations at respective contact points. The locations of the contact points are controlled such that a force load transmitted by the contact points is evenly distributed among the contact points to thus minimize the maximum force transmitted. The location of the contact points is controlled such that a key bar stress at the connection points is also minimized.

13 Claims, 5 Drawing Sheets

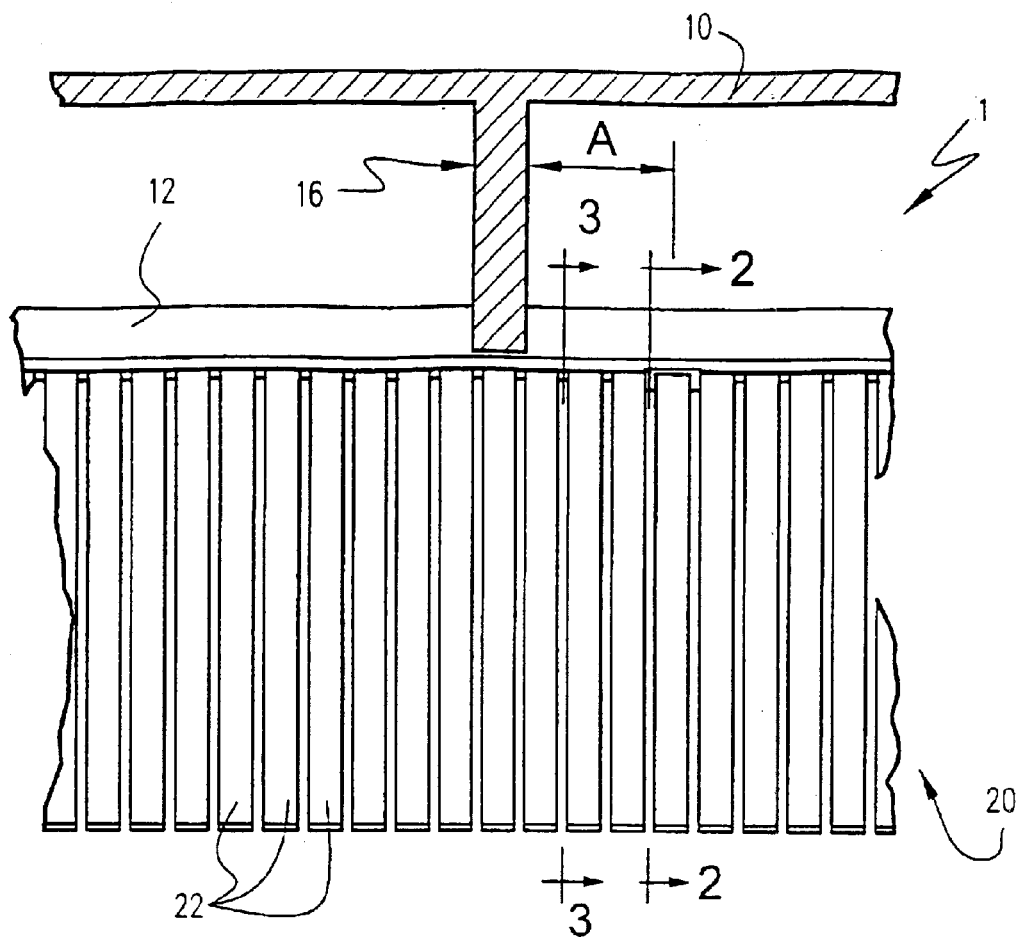
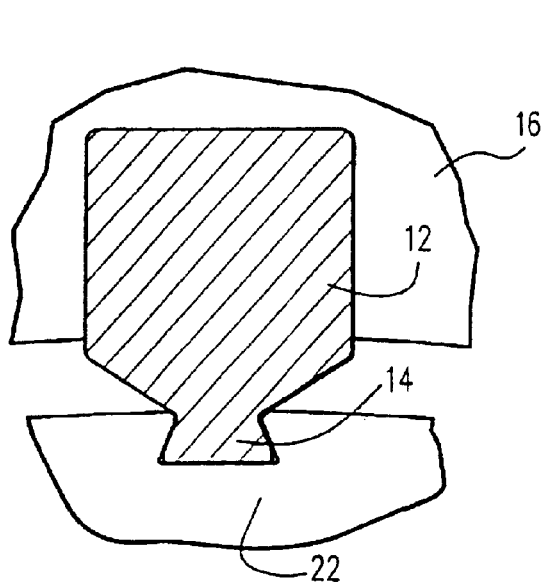
Fig.2
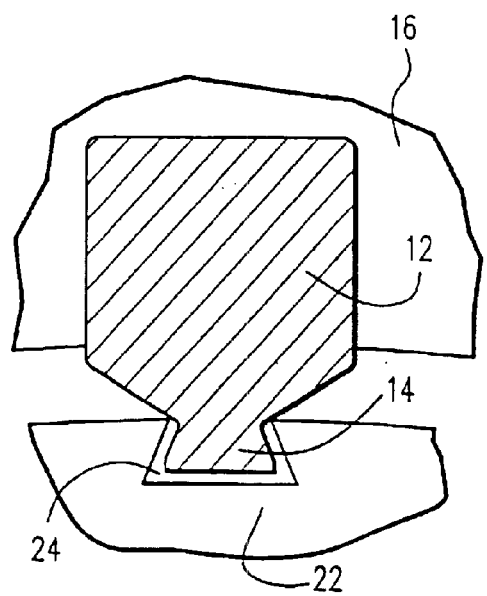
Fig.3

METHOD OF FORMING A STATOR

This application is a division of application Ser. No. 09/733,556, filed Dec. 8, 2000, (now issued as U.S. Pat. No. 6,597,081), the entire content of which is hereby incorporated by reference in this application.

BACKGROUND OF THE INVENTION

The present invention relates to electric power generators and, more particularly, to a stator having reduced forces transmitted by a dovetail connection between a stator core and a stator frame and a method for forming the same.

A stator of an electric power generator generally includes a stator core and a stator frame. The stator core typically has a cylindrical shape and consists of a stack of insulated steel laminations. Each lamination is a segment of a full circle that has slots on its inner diameter to accommodate a stator winding and dovetail slots on its outer diameter.

The stator frame has plurality of key bars connected thereto, each key bar having a dovetail to provide structural support for the stator core. During the assembly of the stator core, each lamination is installed into the stator frame by engaging a dovetail slot onto a corresponding key bar dovetail. Sufficient clearance must be provided between the key bar dovetails and the faces of the lamination which form the corresponding dovetail slots to allow for the easy assembly of the stator core considering the location and dimensional tolerances of the key bar and laminations. The clearance between the three faces of the key bar dovetail and the opposing faces of the corresponding lamination forming the dovetail slots varies randomly due to the random location of the key bar dovetail within its location tolerance along the length of the key bar. Due to this variable clearance, the actual contact locations between the key bar dovetail and the corresponding lamination (and hence the contact locations between the stator frame and the stator core) is randomly distributed.

When force loads are applied between the stator core and the stator frame, the loads are transmitted through the randomly distributed contact points. The magnitude of the force of a load at each contact point is a function of the stiffness at that contact point. If the stiffness is high at a particular contact point, then the magnitude of the forces at that point are high.

It would thus be beneficial to control the location of the contact points between the stator core and the stator frame. Specifically, it would be beneficial to control the location of the contact points between the key bar dovetails connected to the stator frame and the corresponding laminations which include the respective dovetail slots into which each dovetail is engaged. By controlling the locations of the contact points so that they are arranged at a known locations (and hence known stiffness), the interface force transmitted between the stator core and the key bar (and hence stator frame) can be evenly distributed and the maximum value of this interface force can be reduced. By reducing the maximum value of the interface force, the reliability of the connections can be increased.

BRIEF SUMMARY OF THE INVENTION

In an exemplary embodiment of the invention, a method of forming a stator comprises providing a stator frame having a frame plate, connecting a plurality of key bars to the frame plate at respective connection points, each of the key bars having a dovetail, and providing a stator core comprising a plurality of laminations each having a dovetail slot formed therein. Each dovetail is engaged into a respective dovetail slot so that at least some of the dovetails contact respective laminations at respective contact points. The respective locations of the contact points are controlled such that a force load transmitted by the contact points is evenly distributed among the contact points. The locations of the contact points are also controlled such that the key bar stress at the connection points between the key bars and the frame plate is minimized and a stiffness of all of the contact points is equal. The stiffness is controlled by varying a distance between the contact points and the frame plate. The stiffness can be reduced by arranging the location of a contact point further away from the frame plate.

The locations of the contact points are controlled by varying a cross-sectional area of the dovetail slots such that at least two of the laminations respectively have dovetail slots with different cross-sectional areas. The locations of the contact points can be controlled by increasing the size of the dovetail slots in those laminations where a contact point is not desired and decreasing the size of the dovetail slots in those laminations where a contact point is desired. Alternatively, the locations of contact points can be controlled by respectively arranging wedges within some of the dovetail slots to form contact points between the dovetail and the respective laminations.

In another exemplary embodiment of the present invention, a stator comprises a stator frame having a frame plate, a plurality of key bars connected to the frame plate at respective connection points, each of the key bars having a dovetail, and a stator core comprising a plurality of laminations each having a dovetail slot formed therein. Each of the dovetails engages into respective dovetail slots so that at least some of the dovetails contact respective laminations at respective contact points, the contact points being located such that a force load transmitted by the contact points is evenly distributed among the contact points.

The contact points have locations such that key bar stress at the connection points is minimized and a stiffness of all the contact points is equal. The respective cross-sectional areas of the dovetail slots vary such that at least two of the laminations respectively have dovetail slots which have different cross-sectional areas. The cross-sectional areas of the dovetail slots in those laminations where contact points are not desired is larger than respective cross-sectional areas of the dovetail slots in those laminations where contact points are desired. Alternatively, the stator can further comprise wedges which are respectively arranged within some of the dovetail slots to form contact points between the dovetail and the respective lamination.

BRIEF DESCRIPTION OF THE DRAWINGS

These, as well as other advantages of this invention, will be more completely understood and appreciated by careful study of the following more detailed description of the presently preferred exemplary embodiments of the invention taken in conjunction with the accompanying drawings, in which:

FIG. 1 is a partial cross-sectional view of a stator in accordance with an exemplary embodiment of the present invention;

FIG. 2 is a cross-sectional view take along line 2—2 of the of FIG. 1;

FIG. 3 is a cross-sectional view taken along line 3—3 of FIG. 1;

DETAILED DESCRIPTION OF THE INVENTION

Figure 4:
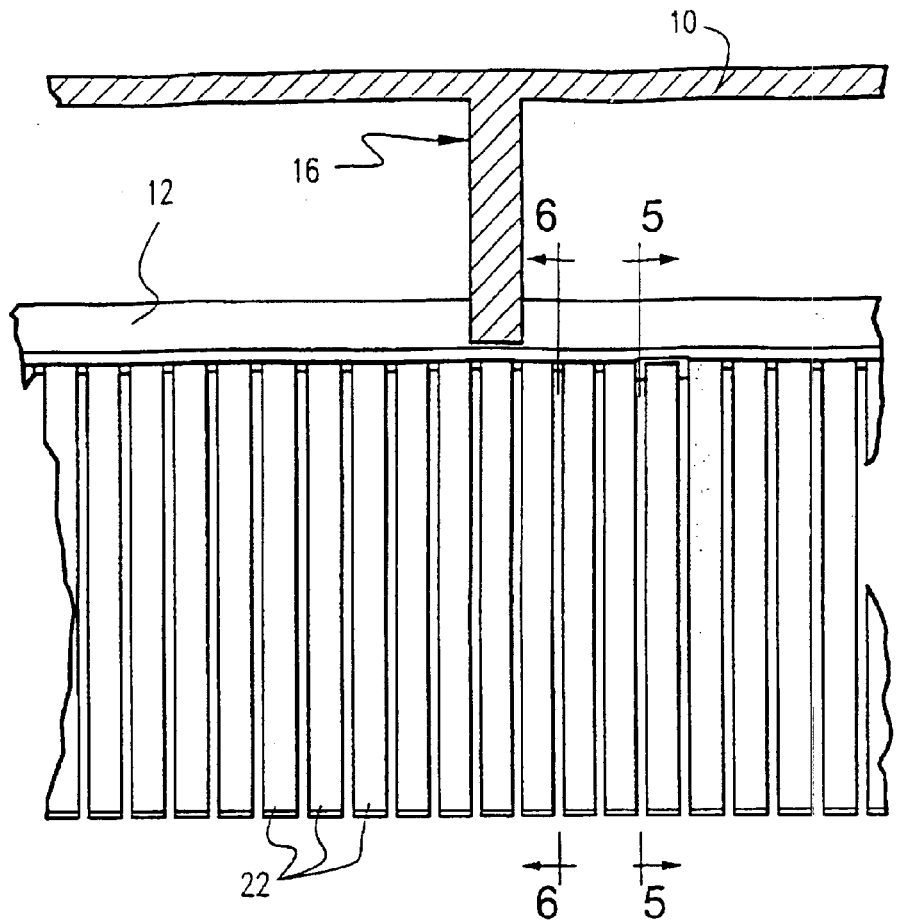
FIG. 4 is a partial cross-sectional view of a stator in accordance with an alternate exemplary embodiment of the present invention.

FIG. 1 is a partial cross-sectional view of a stator 1 of an electric power generator in accordance with an exemplary embodiment of the present invention. The stator 1 includes a stator core 20 formed by a plurality of stacked laminations 22 and a stator frame 10. The stator frame 10 has one or more frame plate 16 which is connected to a plurality of key bars 12 at respective connection points. Each of the laminations 22 has slots (not shown) on its inner diameter to engage a stator winding and dovetail slots 24 (see FIG. 3) on its outer diameter. Each key bar 12 connected to the stator frame 10 has a dovetail 14 (see FIGS. 2–3) which engages into a respective dovetail slot 24 of each lamination 22.

Referring now to FIGS. 2–3, the cross-sectional areas of the respective dovetail slots 24 are not uniform. For example, the stator core 20 comprises a plurality of laminations 22 (one of which is illustrated in FIG. 3) which respectively include dovetail slots 24 having a relatively large cross-sectional area such that the dovetails 14 of the key bars 12 respectively inserted therein do not contact the laminations 22. In contrast, the lamination 22 illustrated in FIG. 2 includes a dovetail slot 24 having a relatively smaller cross-sectional area such that the dovetail 14 of the key bar 12 engaged therein contacts a portion of the lamination 22. This contact between the key bar 12 and respective lamination 22 forms one of the contact points that define an interface between the stator core 20 and the stator frame 10. The stator core 20 includes a plurality of laminations 22 which include the smaller dovetail slot 24 illustrated in FIG. 2, thus defining a plurality of contact points between the stator core 20 and the key bars 12 (and hence a plurality of contact points between the stator core 20 and the stator frame 10) along the longitudinal direction of the stator core 20. The location of these contact points can be selectively controlled. For example, the size of the dovetail slot 24 in a lamination 22 can be increased for locations where a contact point is not desired (as in FIG. 3) and decreased for locations where a contact point is desired (as in FIG. 2).

The stiffness at a contact point can be controlled by the location of the contact point relative to the frame plate 16. The stiffness can be reduced by locating the contact point further away from the frame plate 16 and increased by locating the contact point closer to the frame plate 16. For example, the lamination 22 that is located a distance "A" (see FIG. 1) from the frame plate 16 includes a dovetail slot 24 which is small enough to define a contact point. This contact point has a certain stiffness. If this lamination 22 having this smaller dovetail slot 24 was arranged at a distance greater than "A" from the frame plate 16, then the contact point defined therein would have a reduced stiffness.

The stress at the each connection point between a respective key bar 12 and the frame plate 16 is proportional to the moment at that location. The moment is proportional to the force at the contact point between the stator core 20 and each key bar 12 and to the distance between the frame plate 16 to the contact point.

Force loads are applied between the stator core 20 and the stator frame 10. The force loads that the interface between the stator core 20 and the key bars 12 connected to the stator frame 10 must transmit fall into one of two categories, fixed force loads and fixed deflection loads. Dead weight and generator torque are considered fixed force loads. Stator core vibration loads and relative thermal expansion loads are considered fixed deflection loads.

If the dead weight alone is considered, the sum of the contact forces between the stator core 20 and the key bars 12 must equal the stator core weight. If the locations (and hence stiffness) of all of the contact points between the stator core 20 and the key bars 12 are controlled so that the stiffness of all of the contact points is equal, then the load will be uniformly distributed among all of the contact points and the maximum value of the force transmitted through the contact points will be minimized. The same can be said for the torque load. That is, if the location and hence stiffness of the contact points are controlled so that the stiffness of all of the points is equal, then the load will be uniformly distributed among all of the contact points and the maximum value of the torque load will be minimized.

Since the stator core deflection and relative thermal expansion loads are fixed displacement loads, the interface force between the stator core 20 and the key bars 12 due to each of these loads is a function of the stiffness of the contact point between the key bars 12 and the stator core 20. As noted above, the stiffness can be reduced by locating the contact points further away from the frame plate 16. If the stiffness is reduced, the interface force between the stator core 20 and the key bars 12 due to these loads can be reduced and controlled such that an interface force is evenly distributed among the contact points.

The contact locations between the stator core 20 and the key bars 12 along the longitudinal direction of the stator core 20 can be optimized to minimize the interface force and the key bar stress at the frame plate 16. The contact points should be chosen to have a uniformly low stiffness. This stiffness, however, is limited by the stress due to the moment at the connection point between the key bar 12 and frame plate 16. As noted above, the interface force can be evenly distributed among the contact points by selectively controlling the locations thereof to reduce a maximum value thereof.

FIGS. 4–7 illustrate an alternate exemplary embodiment of the present invention. Specifically, FIG. 4 illustrates a stator 1 that includes a stator core 20 formed by a plurality of stacked laminations 22. The laminations 22 are similar to those illustrated in FIG. 1 except that the dovetail slots 24 respectively formed therein may have substantially the same cross-sectional area. The cross-sectional area of each of the dovetail slots 24 may be large enough so that there is no direct contact between the key bars 12 and the laminations 22 (see FIGS. 5–6).

Figures 5, 6:
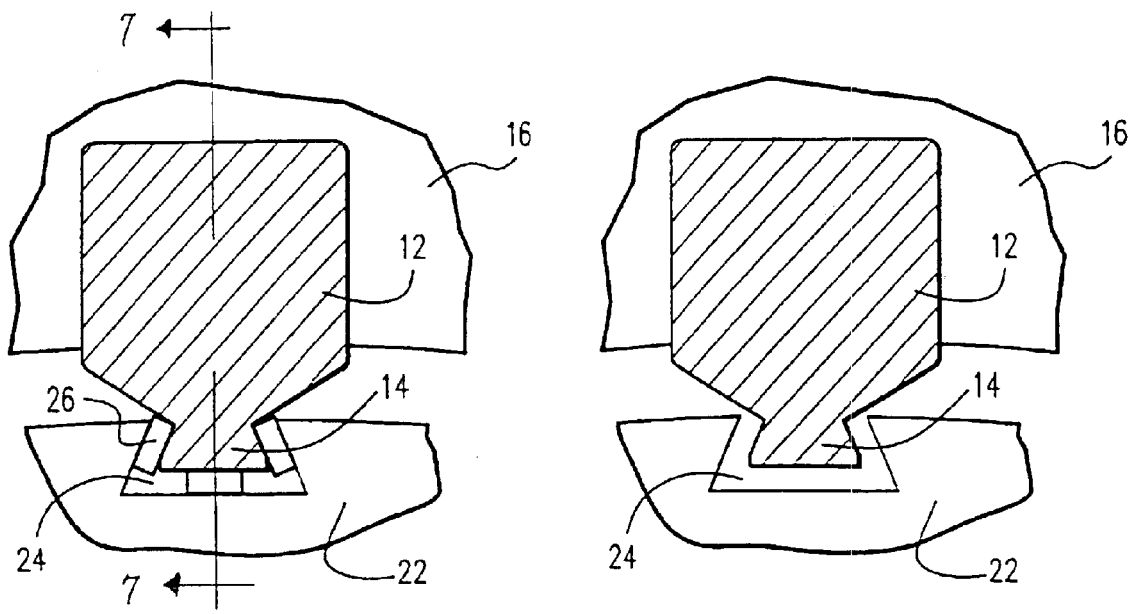
FIG. 5 is a cross-sectional view take along line 5—5 of FIG. 4.
FIG. 6 is a cross-sectional view taken along line 6—6 of FIG. 4.
Figure 7:
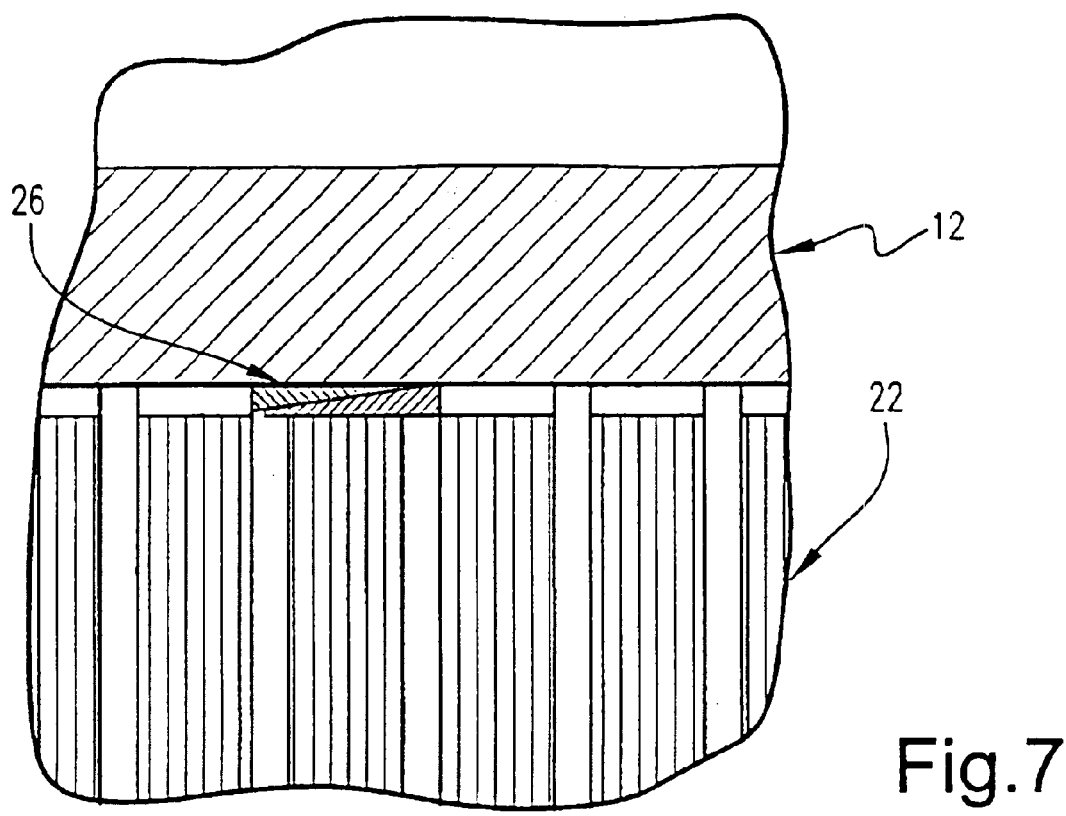
FIG. 7 is a cross-sectional view taken along line 7—7 of FIG. 5.

As illustrated in FIGS. 5 and 7, wedges 26 are placed within at least some of the dovetail slots 24 so that contact points are established between some of the key bars 12 and the stator core 20. The location of these contact points along the longitudinal direction of the stator core 20 can be controlled by selectively choosing which of the laminations 22 include dovetail slots 24 having the wedges 26 inserted therein. As discussed above, the locations are controlled to evenly distribute the interface force between the key bars 12 and the stator core 20 and thus reduce a maximum value thereof.

Figure 8:
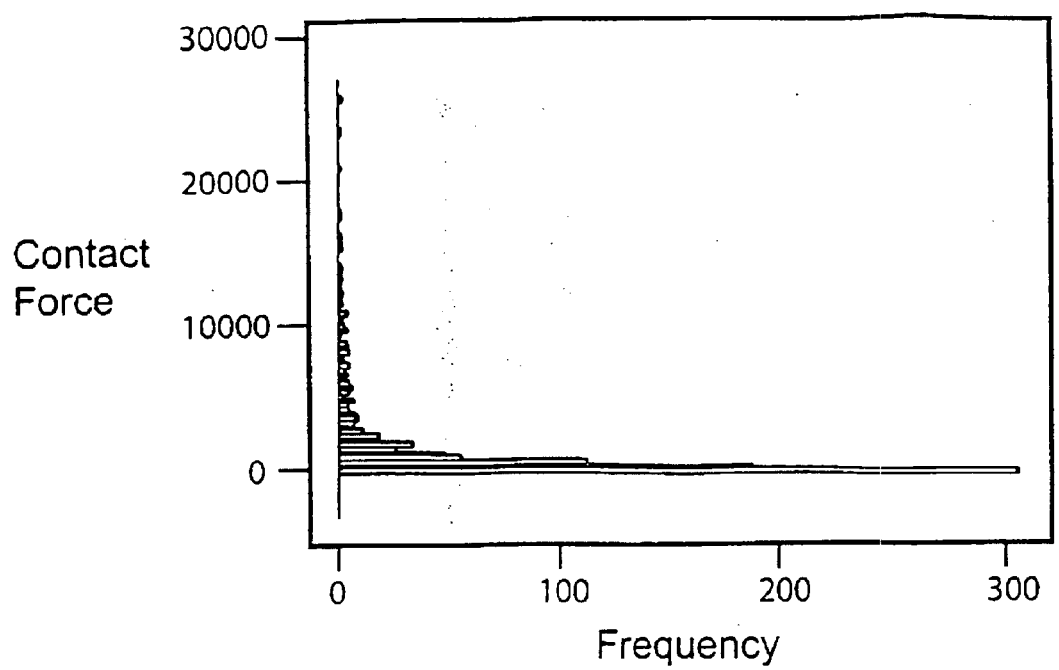
FIG. 8 is a histogram of the contact force for a generator using a conventional assembly method.
Figure 9:
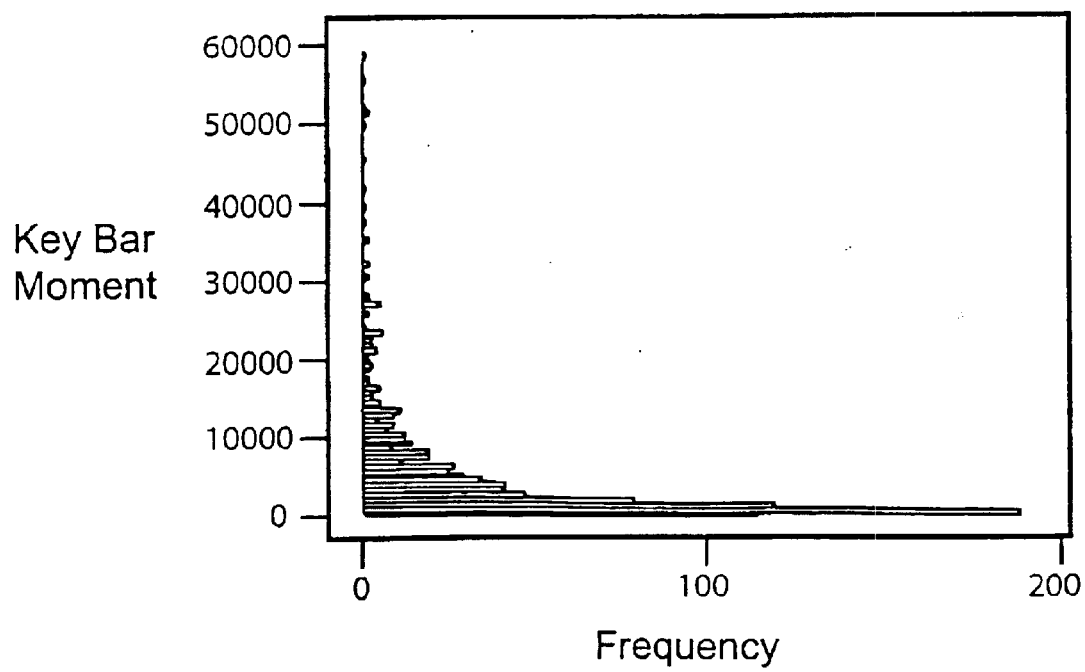
FIG. 9 is a histogram of the key bar moment for a generator using the conventional assembly method.
Figure 10:
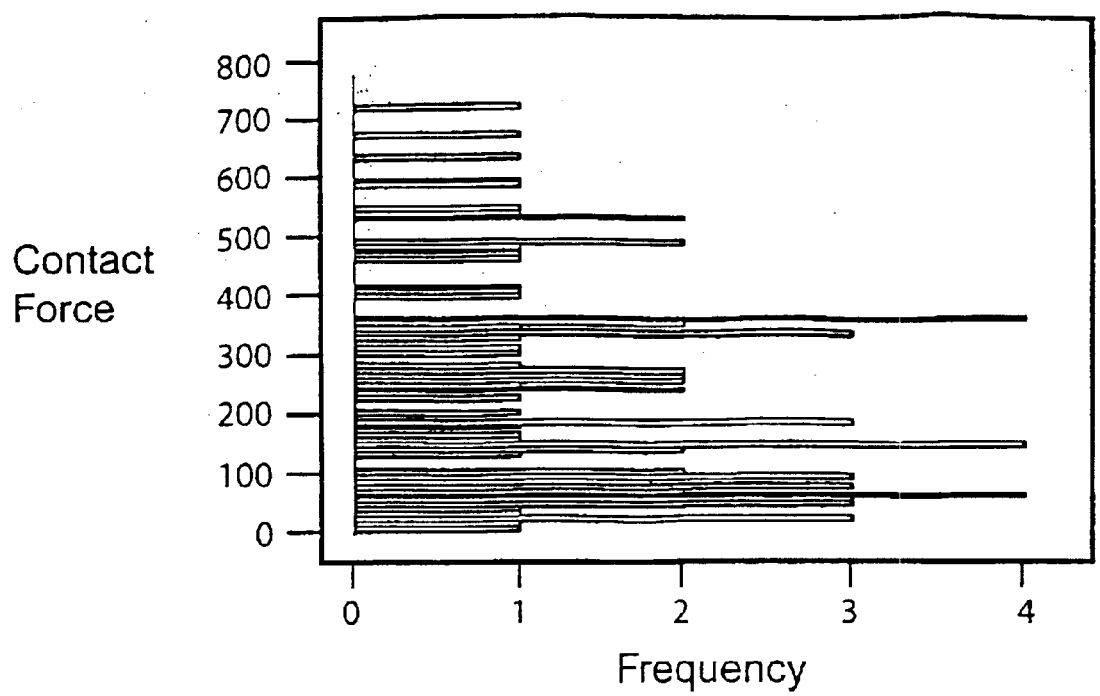
FIG. 10 is a histogram of the contact force for a generator using an assembly method embodying the invention.
Figure 11:
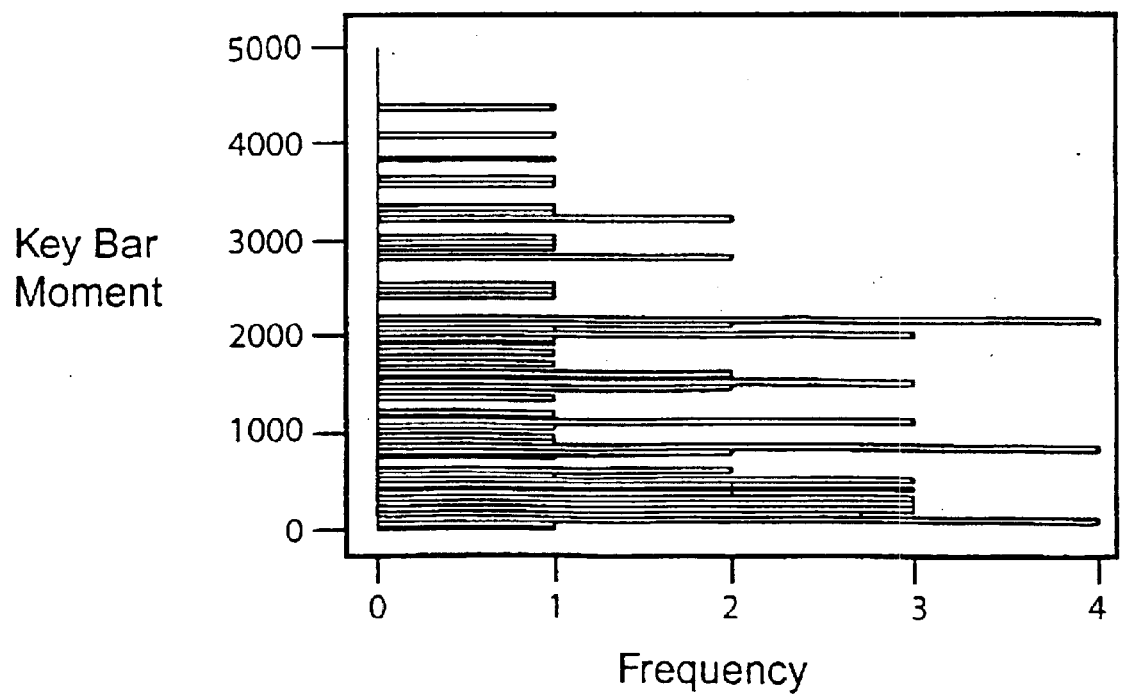
FIG. 11 is a histogram of the key bar moment for a generator using an assembly method embodying the invention.

FIG. 8 is a histogram that illustrates the calculated contact force distribution for a conventional generator where no attempt is made to control the contact locations between the stator core 20 and the dovetails 14 of the respective key bars 12. FIG. 9 is a histogram that shows the calculated key bar moment at the connection point between the key bars 12 and the frame plate 16 for the same conventional generator assembly, method. In contrast, FIG. 10 is a histogram that illustrates the calculated contact force distribution for a generator using the assembly method of the present invention where the contact locations between the stator core 20 and the key bars 12 are confined to certain optimized distances from the frame plate 16. FIG. 11 is a histogram that shows the key bar moment at the frame plate 16 for the generator assembled using the assembly method of the present invention. As those skilled in the art will appreciate, a reduction in the maximum value of both the contact force (FIG. 10) and key bar moment (FIG. 11) is achieved for the optimized design of the present invention.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of forming a stator comprising:
   providing a stator frame having a frame plate;
   connecting a plurality of key bars to said frame plate at respective connection points, each of said key bars having a dovetail;
   providing a stator core comprising a plurality of laminations each having a dovetail slot formed therein; and
   engaging each of the plurality of dovetails into respective dovetail slots, wherein only a subset of the plurality of said dovetails engaged in respective dovetail slots contact respective laminations to define respective contact points, the contact points having respective locations along a longitudinal direction of the stator core such that a force load transmitted by said contact points is evenly distributed among said contact points.

2. The method of claim 1 wherein said contact points have respective locations such that key bar stress at said connection points is minimized.

3. The method of claim 2 wherein said contact points have respective locations such that a stiffness of all said contact points is equal.

4. The method of claim 3 wherein said stiffness varies in accordance with a distance between said contact points and said frame plate.

5. The method of claim 4 wherein said stiffness decreases as the distance of said locations of contact points increases from said frame plate.

6. The method of claim 2 wherein said locations of contact points are defined by respectively arranging wedges within some of said dovetail slots to form said contact points.

7. A method of forming a stator comprising:
   providing a stator frame having a frame plate;
   connecting a plurality of key bars to said frame plate at respective connection points, each of said key bars having a dovetail;
   providing a stator core comprising a plurality of laminations each having a dovetail slot formed therein; and
   engaging each of said dovetails into respective dovetail slots so that a plurality of said dovetails contact respective laminations to define respective contact points, the contact points having respective locations along a longitudinal direction of the stator core such that a force load transmitted by said contact points is evenly distributed among said contact points;
   wherein said locations of contact points are defined by varying a cross-sectional area of said dovetail slots such that at least two of said laminations respectively have dovetail slots which have different cross-sectional areas.

8. The method of claim 7 wherein said locations of contact points are defined by increasing a size of said dovetail slots in those laminations where a contact point is not defined and decreasing a size of said dovetail slots in those laminations where a contact point is defined.

9. A method of forming a stator, the method comprising:
   providing a stator frame having a frame plate;
   connecting a plurality of key bars to said frame plate at respective connection points, each of said key bars having a dovetail; and
   providing a stator core comprising a plurality of laminations each having a dovetail slot formed therein;
   wherein each of said dovetails engages into respective dovetail slots so that at least one of said dovetails engaged within a respective one of the dovetail slots does not contact the lamination having the respective one of the dovetail slots formed therein and a plurality of said dovetails contact respective laminations to define a plurality of respective contact points along a longitudinal direction of the stator core, said contact points having respective locations along the longitudinal direction of the stator core such that a force load transmitted by said contact points is evenly distributed among said contact points.

10. The method of claim 9, wherein said contact points have respective locations along the longitudinal direction of the stator core such that key bar stress at said connection points is at a minimum.

11. The method of claim 10, wherein said contact points have respective locations along the longitudinal direction of the stator core such that a stiffness of all said contact points is equal.

12. The method of claim 9, wherein a cross-sectional area of the respective one of the dovetail slots in which the engaged respective one of the dovetails does not contact the lamination having the respective one of the dovetail slots formed therein is larger than respective cross-sectional areas of said dovetail slots in those laminations where respective contact points are respectively defined.

13. The method of claim 9, further comprising respectively arranging at least one wedge within at least one of the dovetail slots in which the engaged dovetail contacts the lamination to thereby define one of the contact points.

* * * * *